US008232670B2

(12) United States Patent
Breit et al.

(10) Patent No.: US 8,232,670 B2
(45) Date of Patent: Jul. 31, 2012

(54) LOCALIZED UTILITY POWER SYSTEM FOR AIRCRAFT

(75) Inventors: Joseph Sherman Breit, Bellevue, WA (US); Michael Neil Witting, Provo, UT (US); Trevor Laib, Woodinville, WA (US); Richard L. Rankin, Lake Stevens, WA (US); John Anthony Trela, Seattle, WA (US); Markland T. Gates, Gig Harbor, WA (US); Ali Reza Mansouri, Bothell, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 12/362,832

(22) Filed: Jan. 30, 2009

(65) Prior Publication Data

US 2010/0193629 A1    Aug. 5, 2010

(51) Int. Cl.
    B60L 1/00 (2006.01)
(52) U.S. Cl. .......................................... 307/9.1; 307/23
(58) Field of Classification Search .................. 307/9.1, 307/23; 244/58; 429/400
    See application file for complete search history.

(56) References Cited

U.S. PATENT DOCUMENTS

| | | | | |
|---|---|---|---|---|
| 5,217,187 | A * | 6/1993 | Criswell ..................... | 244/171.3 |
| 7,285,753 | B2 * | 10/2007 | Hoehne et al. ............... | 219/386 |
| 2007/0069078 | A1 * | 3/2007 | Hoffjann et al. ........... | 244/129.1 |
| 2007/0110861 | A1 * | 5/2007 | Hoffjann et al. ............... | 426/412 |
| 2008/0001026 | A1 * | 1/2008 | Hoffjann et al. ................. | 244/58 |
| 2008/0038597 | A1 | 2/2008 | Hoffjann et al. | |
| 2008/0077802 | A1 * | 3/2008 | Richardson et al. .......... | 713/189 |
| 2008/0127411 | A1 * | 6/2008 | Hoffjann et al. .................. | 4/664 |
| 2008/0150356 | A1 | 6/2008 | Breit et al. | |
| 2008/0191094 | A1 | 8/2008 | Heinrich et al. | |
| 2010/0221642 | A1 * | 9/2010 | Frahm et al. .................. | 429/512 |

FOREIGN PATENT DOCUMENTS

| | | |
|---|---|---|
| DE | 10249588 A1 | 5/2004 |
| WO | 2006058774 A2 | 6/2006 |

OTHER PUBLICATIONS

European Patent Office Extended European Search Report for Foreign Counterpart EP Patent Application EP10250159-2422/2213571, dated Oct. 31, 2011, 7 pages.

* cited by examiner

*Primary Examiner* — Daniel Cavallari (57) ABSTRACT

The disclosure provides for an aircraft galley and lavatory energy system capable of independent operation from a separate aircraft energy generating system. The galley and lavatory energy system comprises an energy source providing electrical energy, heat energy, and at least one by-product; a plurality of galley and lavatory devices for receiving the electrical energy, the heat energy, and the at least one by-product; and, a plurality of connectors for connecting the electrical energy, the heat energy, and the at least one by-product to the galley and lavatory devices. The energy source comprises a fuel cell, a fuel module, and optionally, a supplemental fuel source.

18 Claims, 10 Drawing Sheets

LOCALIZED UTILITY POWER SYSTEM FOR AIRCRAFT

BACKGROUND

1) Field of the Disclosure

The disclosure relates to power or energy systems for distributing power or energy in vehicles. In particular, the disclosure relates to a localized utility power or energy system for distributing power or energy to galleys, lavatories, and similar utility loads in an aircraft.

2) Description of Related Art

Various vehicles such as aircraft, automobiles, trucks, maritime vessels, recreational vehicles, and other vehicles, typically include power or energy distribution systems for generating and distributing power, often electrical power, to various loads included onboard the vehicle. For example, in an aircraft, loads commonly found in the power distribution system may include galley ovens, heaters and refrigeration units, lavatories, flight controls, avionics, lighting, and other various loads. Aircraft power or energy generation is typically carried out by engine-driven generators, auxiliary power units, electrical distribution systems, and one or more ram air turbines (RATs) which are small turbines connected to hydraulic pumps or electrical generators used as power sources for aircraft. Typically, the source of power or energy for aircraft galley, lavatory, and similar utility loads is generated from such engine-driven generators and electrical distribution systems that include various system elements for conversion of power, control and protection, and associated wiring. RATs are typically required as a back-up source of power for flight critical loads and are seldom required due to the presence of other redundant power sources. However, the aircraft has to carry the added weight of the RATs, thus increasing the overall weight and fuel burn of the aircraft. In addition, known systems for powering aircraft galleys, lavatories, and similar utility loads using engine-driven generators constitute loads that are typically placed on the aircraft. The generators must be of a large enough size to sufficiently power such loads. The generators are typically driven off an engine gear box and there may be two or more such engine gear boxes on an aircraft. Thus, tremendous electrical power is required and the associated volume and weight of the equipment can be significant. The additional weight and volume of the power system can increase the fuel burn of the aircraft and can decrease the efficiency of the aircraft. Moreover, known power or energy systems typically require aircraft galleys, lavatories, and similar utility loads to be connected to the centralized aircraft power sources in order to obtain power, and such centralized aircraft power sources may be a considerable distance away from the aircraft galleys, lavatories, and similar utility loads. The use of lengthy wiring and wiring connections is typically required to connect the centralized power sources, such as the engine-driven generators and electrical distribution systems, to the aircraft galleys, lavatories, and similar utility loads, thus further increasing the complexity and cost of the system, and the electrical losses, as well as the weight of the wiring, can increase the fuel burn of the aircraft. Further, such known power or energy systems are not designed to generate or recycle on-board water, such as greywater, for various applications on the aircraft. Greywater which is non-industrial wastewater generated from domestic processes, such as dishwashing, laundry and bathing, and which may be used on aircraft for such applications as washing, flushing toilets, and heating drain standpipes, is typically loaded onto the aircraft in containers or tanks before the aircraft takes off. Such containers or tanks of greywater may be stored in the cargo bay or other areas of the aircraft and add additional weight to the aircraft and further increase the fuel burn of the aircraft. In addition, known power systems typically have to size the electrical power generating system for the maximum electrical power generating system in an aircraft configuration, and there is little or no flexibility in sizing.

Accordingly, there is a need for a localized utility power or energy system for distributing power or energy in an aircraft, and in particular, to aircraft galleys, lavatories, and similar utility loads, that provides advantages over known systems.

SUMMARY

This need for a localized utility power or energy system for distributing power or energy in an aircraft, and in particular, to aircraft galleys, lavatories, and similar utility loads is satisfied. None of the known systems provide all of the numerous advantages discussed herein. Unlike known systems, embodiments of the system of the disclosure may provide one or more of the following advantages: provides a localized utility power or energy system that uses a fuel cell, fuel module, and fuel source to produce both electrical power or energy and heat energy to power devices in vehicles, such as aircraft galley, lavatory and similar utility load devices, and provides a power or energy system that does not need to be connected to a centralized vehicle or aircraft power or energy system; provides a localized utility power or energy system that has improved efficiency, reduced weight, reduced complexity, improved flexibility in installation, simplified control and protection, and improved ease of manufacturability, all resulting in reduced costs; provides a localized utility power or energy system that uses a fuel efficient fuel cell to reduce the total power consumption of a vehicle, such as an aircraft; provides a localized utility power or energy system that uses a fuel cell in close proximity to a fuel source, thus eliminating or minimizing the use of lengthy wiring and associated wiring connections between the power system and the power source and thus further reducing the complexity, cost, and weight of the power system and increasing the reliability of the power system; provides a localized utility power or energy system that uses a fuel cell which produces water as a by-product that may be used as greywater, thus eliminating or minimizing the use of containers carrying greywater that are stored on a vehicle, such as an aircraft, and thus decreasing the overall weight of the vehicle; provides a localized utility power or energy system that allows for optimum aircraft configuration without restrictions for wiring connections and allows for minimal configuration without a penalty in aircraft electrical power rating, thus resulting in an aircraft power system that has a lower rating and weighs less; provides a localized utility power or energy system that may be used in various vehicles, including but not limited to, aircraft such as airplanes, automobiles, trucks, maritime vessels, recreational vehicles, and other vehicles; provides a localized utility power or energy system that is environmentally friendly and allows for waste heat to be used and recycled rather than be released into another area of the vehicle, such as the cabin of an aircraft, where such released heat can add to the operating cost of the vehicle by requiring additional environmental control system cooling; provides a localized utility power or energy system that may increase the number of emergency power sources on a vehicle, such as an aircraft, thus decreasing the need for heavy RATs, resulting in overall reduced weight of the aircraft and reduced aircraft fuel burn; and provides a localized utility power or energy system that uses a fuel cell that may be powered by numerous fuel sources such as hydrogen, sodium borohydride, hydrocarbons, methanol, biodiesel, synthetic fuel, kerosene, ethanol, methane, and other suitable fuel sources.

In an embodiment of the disclosure, there is provided an aircraft galley and lavatory energy system capable of independent operation from a separate aircraft energy generating system. The galley and lavatory energy system comprises an energy source providing electrical energy, heat energy, and at least one by-product; a plurality of galley and lavatory devices for receiving the electrical energy, the heat energy, and the at least one by-product; and, a plurality of connectors for connecting the electrical energy, the heat energy, and the at least one by-product to the galley and lavatory devices.

In another embodiment of the disclosure, there is provided a localized utility energy system for distributing energy to an aircraft galley and an aircraft lavatory and capable of independent operation from a separate aircraft energy generating system. The localized utility energy system comprises an energy source providing electrical energy, heat energy, and at least one by-product. The energy source comprises a fuel cell, a fuel module, and optionally at least one supplemental fuel source. The by-product may comprise water, waste heat, or waste electricity. The localized utility energy system further comprises a plurality of galley and lavatory appliances for receiving the electrical energy, the heat energy, and the at least one by-product. The localized utility energy system further comprises a plurality of connectors for connecting the electrical energy, the heat energy, and the at least one by-product to the galley and lavatory appliances.

In another embodiment of the disclosure, there is provided an aircraft comprising an aircraft structure including an elongated body and at least one wing extending laterally from the body, at least one galley, and at least one lavatory, and a localized utility energy system for distributing energy to the at least one galley and the at least one lavatory. The localized utility energy system is capable of independent operation from a separate aircraft energy generating system. The localized utility energy system comprises an energy source providing electrical energy, heat energy, and at least one by-product. The energy source comprises a fuel cell, a fuel module, and optionally at least one supplemental fuel source. The by-product may comprise water, waste heat, or waste electricity. The localized utility energy system further comprises a plurality of galley and lavatory appliances for receiving the electrical energy, the heat energy, and the at least one by-product. The localized utility energy system further comprises a plurality of connectors for connecting the electrical energy, the heat energy, and the at least one by-product to the galley and lavatory appliances.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for a power or energy system that provides localized utility power or energy to a vehicle such as an aircraft. In particular, the power or energy system provides electrical power or energy and heat energy to a galley, lavatory, or similar utility loads in an aircraft. The system of the disclosed embodiments may be used in vehicles, including but not limited to, aircraft such as airplanes, automobiles, trucks, maritime vessels, recreational vehicles, and other vehicles and craft. Accordingly, one of ordinary skill in the art will recognize and appreciate that the system of the disclosure can be used in any number of applications involving localized utility power or energy systems for use in vehicles, including but not limited to, aircraft such as airplanes, automobiles, trucks, maritime vessels, recreational vehicles, and other vehicles and craft.

Figure 1:
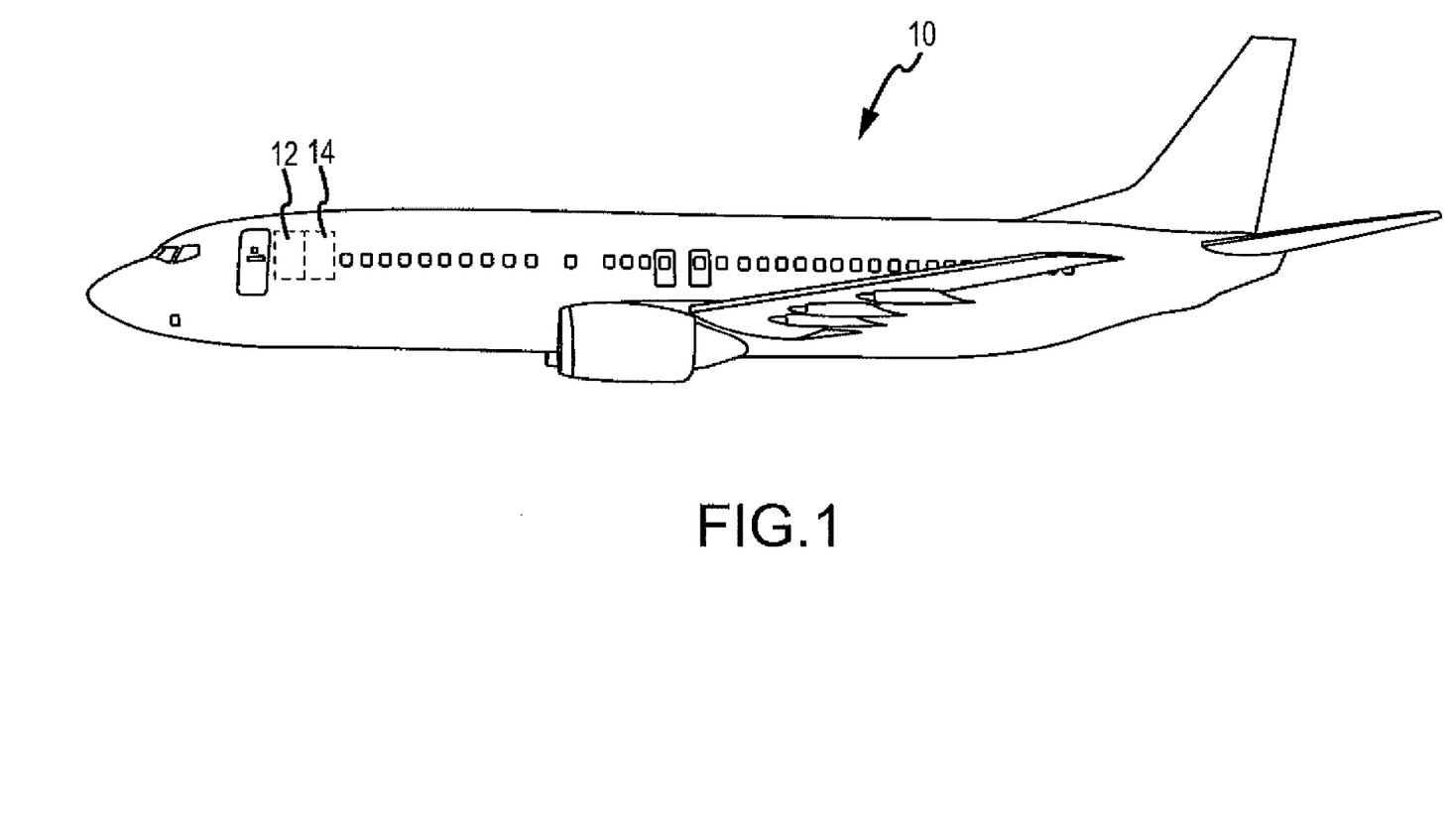
FIG. 1 is a schematic illustration of a conventional aircraft showing the location of at least one conventional galley and lavatory inside the aircraft.

Referring more particularly to the drawings, FIG. 1 is a schematic illustration of a conventional aircraft 10 showing the location of at least one conventional galley 12 and lavatory 14 in the interior of the aircraft 10.

Figure 2:
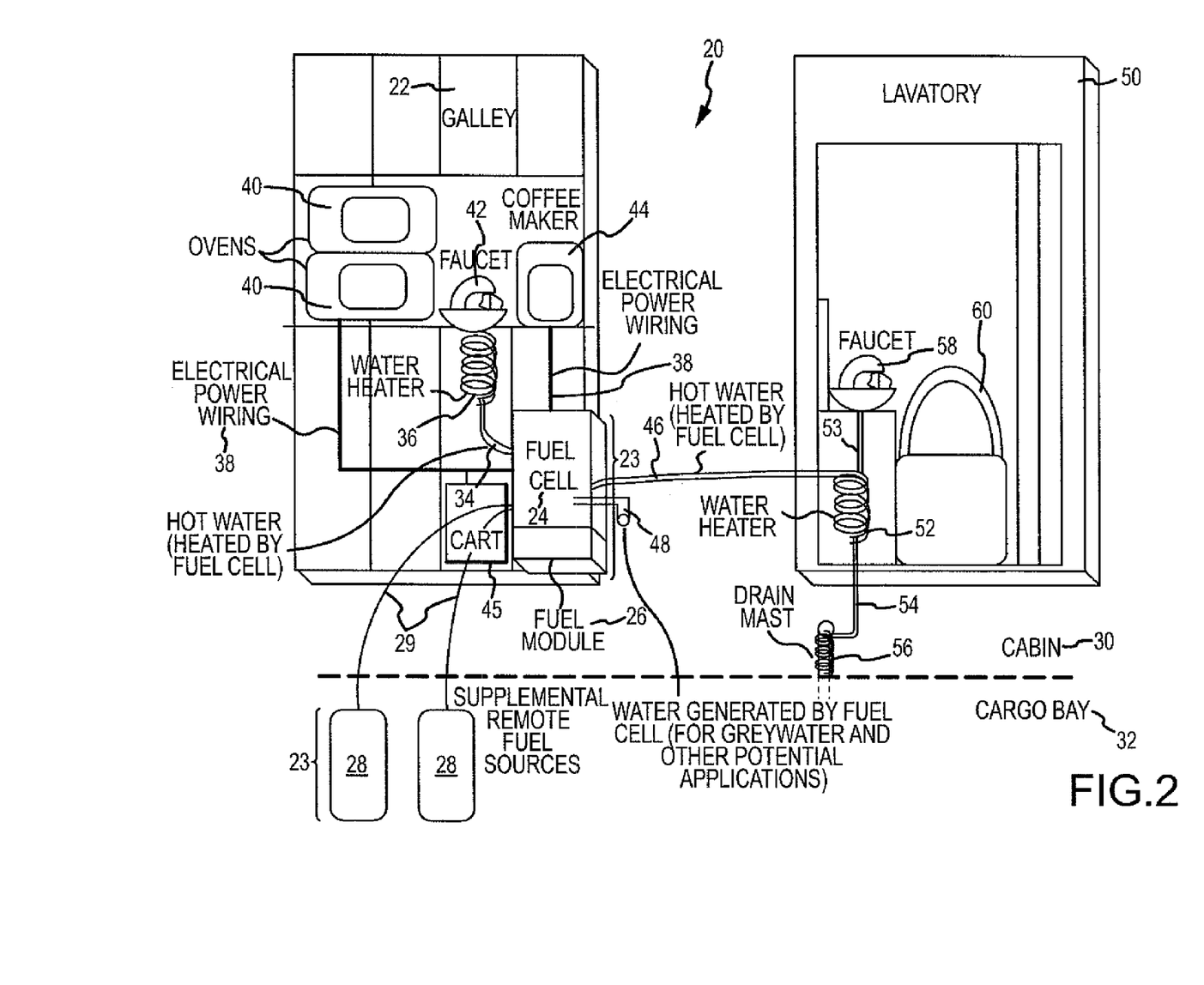
FIG. 2 is a schematic diagram of an embodiment of the localized utility power or energy system of the disclosure.

FIG. 2 is a schematic diagram of an embodiment of a localized utility power or energy system or aircraft galley and lavatory energy system 20 of the disclosure. The localized utility power or energy system or aircraft galley and lavatory energy system 20 is capable of independent operation from a separate aircraft energy generating system (not shown), similar to the operation of a utility micro-grid. The separate energy generating system may comprise engine-driven generators, auxiliary power units, ram air turbines (RATs), electrical distribution systems, or another suitable energy generating system. The galley and lavatory energy system acts as a micro-grid (see FIG. 9) capable of independent operation from a main power grid of the separate aircraft energy generating system. The system 20 is used to provide electrical power or energy and heat energy to a galley 22 and a lavatory 50 located in an interior cabin 30 of an aircraft. One or more systems 20 may be used in the aircraft depending on the number of galleys and lavatories on the aircraft. The system 20 may also be used to provide electrical power or energy and heat energy to other similar utility loads, such as cargo containers that have built-in heating and cooling systems, in-flight entertainment systems, or other utility loads. The system 20 comprises an energy source 23 providing electrical energy, heat energy, and at least one by-product. The by-product may comprise water, waste heat, waste electricity, or another suitable by-product. The energy source 23 comprises a fuel cell 24 and a fuel module 26 and optionally at least one supplemental fuel source 28. In this embodiment, the fuel cell 24 and the fuel module 26 are located integrally in the galley 22 of the aircraft. In one embodiment of the disclosure (FIG. 2), the fuel cell and fuel module are located within the physical boundaries of the galley or the lavatory of the aircraft, and the at least one supplemental fuel source is located in a remote area of the aircraft separate from the galley and the lavatory. The supplemental fuel source or sources 28 may be located in a tank or container, such as hydrogen tanks or canisters, in a remote location in the aircraft, such as for example, a cargo bay 32, wing fairings and areas in the extremities of the cargo bay or aft of the pressure bulkhead in the tail (not shown), unused areas forward of the electronic equipment bay or in the upper portion of the cabin (not shown) or another suitable remote location. In another embodiment of the disclosure (see FIG. 3), the at least one supplemental fuel source is located within physical boundaries of the galley or the lavatory of the aircraft, and the fuel cell and fuel module are located in a remote area of the aircraft separate from the galley and the lavatory. The remote area may comprise the cargo bay 32, wing fairings and areas in the extremities of the cargo bay or aft of the pressure bulkhead in the tail (not shown), unused areas forward of the electronic equipment bay or in the upper portion of the cabin (not shown) or another suitable remote location. The fuel cell 24 may be connected to the supplemental fuel sources 28 via fuel lines 29, depending on the type of fuel used. In an alternative, the fuel cell 24 is adjacent to or integral with the fuel module 26 and does not require fuel lines unless there may be an internal ducting between the fuel cell and the fuel module.

Fuel cell technology provides the capability for a localized power source that may be more efficient and easier to use than electricity from conventional engine-driven generators. The energy source of the disclosure uses the unique capabilities of a fuel cell in defining a novel type of distributed and localized power for aircraft non-critical loads. The fuel cell may comprise a standard polymer exchange membrane (PEM) fuel cell having an anode, a cathode, a proton exchange electrolyte membrane, and a catalyst. The fuel cell may also comprise alkaline fuel cells, direct methanol fuel cells, enzyme based fuel cells, regenerative fuel cells, phosphoric acid fuel cells, solid oxide fuel cells, high temperature PEM fuel cells, or other suitable fuel cells. The galley power may also be supplemented by a battery or batteries and/or supercapacitors. Power or energy to the fuel cell 24 is preferably supplied by the fuel module 26 that may be located adjacent the fuel cell 24 in the galley 22. However, the fuel module 26 does not have to be located adjacent the fuel cell 24 and can be located in another location near or remote to the fuel cell 24. Power or energy to the fuel cell 24 may also be supplied by the one or more supplemental fuel sources 28. Having one or more supplemental fuel sources allows for the option of not having to put fuel in the galley if it is not desired. If the fuel for the fuel cell 24 is stored in a fuel module 26 located in the galley 22, the fuel module 26 may be loaded at the same time that food is loaded onto the aircraft. Alternatively, fuels placed in a remote location due to their size or for safety reasons, may be changed when the cargo is loaded. The fuel in the fuel module and/or supplemental fuel sources that supplies the power to the fuel cell may be in the form of fuels such as hydrogen, sodium borohydride, hydrocarbons, methanol, biodiesel, synthetic fuel, kerosene, ethanol, methane, or another suitable fuel.

The localized utility power or energy system or aircraft galley and lavatory energy system 20 further comprises a plurality of galley and lavatory devices 40, 42, 44, 45, 58 for receiving the electrical energy, the heat energy, and/or the at least one by-product. The galley and lavatory devices comprise appliances and fixtures such as galley ovens 40, a galley coffee maker 44, a galley faucet 42, one or more compartments in a portable food and beverage cart 45, a lavatory faucet 58, a refrigerator (not shown), or other suitable appliances and fixtures. Compartments in the portable food and beverage cart may comprise chilled compartments and/or heated compartments. The portable food and beverage cart may be plugged into a plug area (not shown) in the galley 22 to power or energize the compartments. The fuel cell produces electrical power or energy that may be used to power the galley and lavatory devices.

The localized utility power or energy system or galley and lavatory energy system 20 further comprises a plurality of connectors 34, 38, 46, 54 for connecting the electrical energy, the heat energy, and the at least one by-product to the galley and lavatory devices. Because the system 20 of the disclosure is a localized utility power system, it works independently of a conventional centralized aircraft power system such as RATs, engine-driven generators, auxiliary power units, and electrical distribution systems, and does not require additional wiring and wiring connectors associated with such centralized aircraft power system. The plurality of connectors may comprise galley water heater line 34, electrical power wiring 38, lavatory water heater line 46, drain mast drain line 54, fuel line 74 (see FIG. 3), communications and control wiring (not shown), protection wiring (not shown), or other suitable connectors. Electrical power or energy from the fuel cell 24 may be distributed to galley ovens 40, galley coffee maker 44, food and beverage cart 45, and other suitable galley devices or appliances via electrical power wiring 38. Heat or waste heat from the fuel cell 24 may also be used to heat water for one or more galley faucets 42, lavatory faucets 58, or other suitable faucets. Heat from the fuel cell 24 may be distributed to a galley water heater 36 via the galley water heater line 34 connected between the fuel cell 24 and the galley water heater 36. The heat from the fuel cell 24 heats water in the galley water heater 36 for use with the galley faucet 42. Heat or waste heat from the fuel cell 24 may also be distributed to a lavatory water heater 52 via the lavatory water heater line 46 connected between the fuel cell 24 and the lavatory water heater 52. The heat from the fuel cell 24 heats water in the lavatory water heater 52 for use with the lavatory faucet 58 which is carried via water line 53. The heated water in the lavatory water heater 52 may also be used to heat a drain mast 56 connected to the lavatory water heater 52 via a drain mast drain line 54. For purposes of this application, a drain mast is a fin-shaped structure that is about one foot in length that extends from an outer surface of the aircraft. Wastewater from the galleys and from the sinks in the lavatories typically drain overboard through one or more drain masts. Aircraft typically have a forward drain mast for draining wastewater from a forward galley and lavatory, and an aft drain mast for draining wastewater from an aft galley and lavatory. The drain mast drain line 54 feeds from the lavatory water heater 52 into the drain mast 56 which then vents any leakage liquid to the atmosphere outside the slip stream boundary layer of the aircraft. Because the atmospheric temperature is so cold, residue liquid that is caught in the drain mast can freeze, and the drain mast must be heated, typically with a multi-kilowatt heater that consumes considerable electrical power on an aircraft, to keep such liquid from freezing. Thus, heat or waste heat from the fuel cell 24 may be used to heat water in the lavatory water heater 52 to, in turn, heat the drain mast 56 to prevent freezing of such liquid, and the use of the electrical drain mast heater can be minimized or eliminated. Heat from the fuel cell 24 may also be used for other applications in the aircraft such as generating electrical power. The fuel cell 24 of the system 20 may also produce water as a by-product and such water may be collected from a drain 48 of the fuel cell 24 and stored in a suitable storage container (not shown) to be used for greywater applications in the aircraft. Thus, no greywater or not as much greywater needs to be carried and stored on the aircraft, resulting in reduced overall weight on the aircraft. Using the fuel cells to generate some of the greywater during an aircraft flight allows for less greywater to have to be carried during an aircraft flight. The fuel cell water by-product may also be purified as necessary and used as drinking water. Wastewater and waste from toilet 60 is typically drained and stored in waste storage tanks (not shown) stored in the cargo bay or another location in the aircraft. In addition, the fuel cell uses oxygen and may be used for air inerting purposes in the vicinity of fuels.

Figure 3:
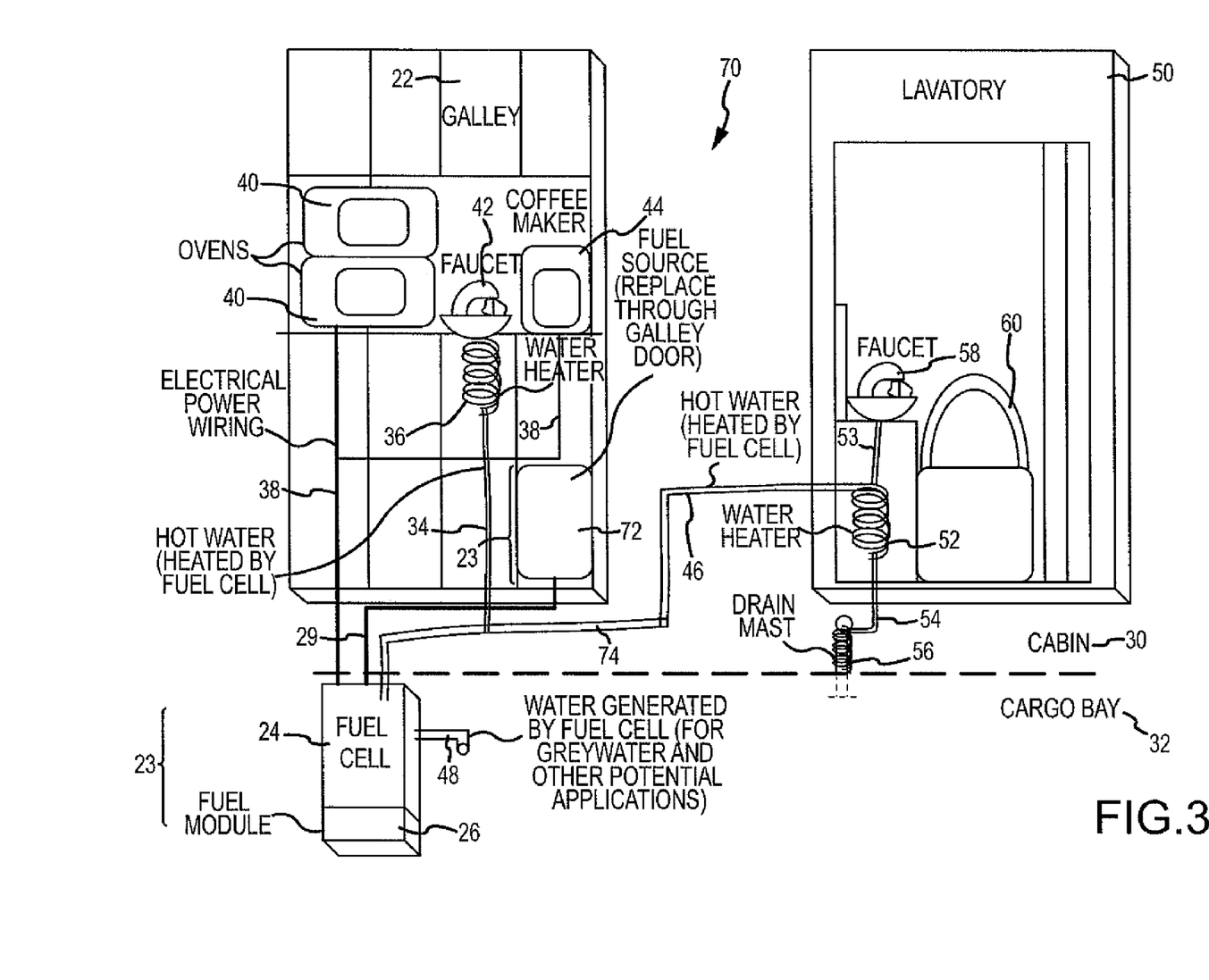
FIG. 3 is a schematic diagram of another embodiment of the localized utility power or energy system of the disclosure.

FIG. 3 is a schematic diagram of another embodiment of a localized utility power or energy system or aircraft galley and lavatory energy system 70 of the disclosure, similar to a utility micro-grid. This system 70 is similar to system 20 discussed above, except that the fuel cell 24 and fuel module 26 are now located in a remote location such as the cargo bay 32 or another remote location, and a fuel source 72 is located integrally in the galley 22 of the aircraft. This allows the fuel to be brought onboard with the food while still isolating the fuel cell from the cabin or providing better proximity to the heat loads such as the lavatory and drain mast. When the fuel cell is located in a remote location, such as the cargo bay, the source of fuel (i.e. a hydrogen cannister) may be loaded with the cargo. This embodiment is preferred when the fuel cell is of a size that is too large to fit within the galley and a larger area is needed. The system 70 is used to provide electrical power or energy and heat energy to the galley 22 and the lavatory 50 located in the interior cabin 30 of an aircraft. One or more systems 70 may be used in the aircraft depending on the number of galleys and lavatories on the aircraft. The system 70 may also be used to provide electrical power or energy and heat energy to other similar utility loads, such as cargo containers that have built-in heating and cooling systems, in-flight entertainment systems, or other utility loads.

The system 70 comprises an energy source 23 providing electrical energy, heat energy, and at least one by-product. The by-product may comprise water, waste heat, waste electricity or another suitable by-product. The energy source 23 comprises fuel cell 24 and fuel module 26 and optionally at least one supplemental fuel source 28. In this embodiment of the disclosure, the at least one supplemental fuel source is located within physical boundaries of the galley or the lavatory of the aircraft, and the fuel cell and fuel module are located in a remote area of the aircraft separate from the galley and the lavatory. The remote area may comprise the cargo bay 32, wing fairings and areas in the extremities of the cargo bay or aft of the pressure bulkhead in the tail (not shown), unused areas forward of the electronic equipment bay or in the upper portion of the cabin (not shown) or another suitable remote location. The fuel cell and fuel used in this embodiment is as described above in connection with system 20. Power to the fuel cell 24 may be supplied by the one or more supplemental fuel sources 72 located in the galley 22. The fuel cell 24 is connected to the supplemental fuel sources 28 via fuel lines 29. The localized utility power or energy system or aircraft galley and lavatory energy system 70 further comprises a plurality of galley and lavatory devices 40, 42, 44, 45, 58 for receiving the electrical energy, the heat energy, and/or the at least one by-product. The galley and lavatory devices comprise appliances and fixtures such as galley ovens 40, a galley coffee maker 44, a galley faucet 42, one or more compartments in a portable food and beverage cart 45, a lavatory faucet 58, a refrigerator (not shown), or other appliances and fixtures. The fuel cell 24 produces electrical power that may be used to power devices in the galley, such as galley ovens 40, galley coffee maker 44, one or more compartments in a portable food and beverage cart 45, a refrigerator (not shown) and other suitable devices. The fuel cell 24 and module 26 may also be of a size, in combination, suitable to fit into the area occupied by the cart 45. Electrical power from the fuel cell 24 may be distributed to such galley ovens 40, galley coffee maker 44, one or more compartments in a portable food and beverage cart 45, refrigerators (not shown), or other suitable devices or appliances via electrical power wiring 38.

The localized utility power or energy system or galley and lavatory energy system 70 further comprises a plurality of connectors 34, 38, 46, 54, and 74 for connecting the electrical energy, the heat energy, and the at least one by-product to the galley and lavatory devices. The system 70 of the disclosure is a localized utility power system or aircraft galley and lavatory energy system, and it works independently of a conventional centralized aircraft power system such as RATs, engine-driven generators, auxiliary power units, and electrical distribution systems, and does not require additional wiring and wiring connectors associated with such centralized aircraft power system. Heat or waste heat from the fuel cell 24 may also be used to heat water for one or more galley faucets 42, lavatory faucets 58, or other suitable faucets. Heat from the fuel cell 24 may be distributed to the galley water heater 36 via the galley water heater line 34 connected between a fuel cell line 74 of the fuel cell 24 and the galley water heater 36. The heat from the fuel cell 24 heats water in the galley water heater 36 for use with the galley faucet 42. Heat or waste heat from the fuel cell 24 may also be distributed to lavatory water heater 52 via lavatory water heater line 46. The heat from the fuel cell 24 heats water in the lavatory water heater 52 for use with the lavatory faucet 58 which is carried via water line 53. The heated water in the lavatory water heater 52 may also be used to heat drain mast 56 connected to the lavatory water heater 52 via drain mast drain line 54. Heat from the fuel cell 24 may also be used for other applications in the aircraft such as such as generating electrical power. The fuel cell 24 of the power system may also produce water as a by-product, and such water may be collected from a drain 48 of the fuel cell 24 and stored in a suitable storage container (not shown) to be used for greywater applications in the aircraft. Thus, no greywater or not as much greywater needs to be carried and stored on the aircraft, resulting in reduced overall weight. Using the fuel cells to generate some of the greywater during an aircraft flight allows for less greywater to have to be carried during an aircraft flight. The fuel cell water by-product may also be purified as necessary and used as drinking water. Wastewater and waste from toilet 60 is typically drained and stored in waste storage tanks (not shown) stored in the cargo bay or another location in the aircraft.

Figure 10:
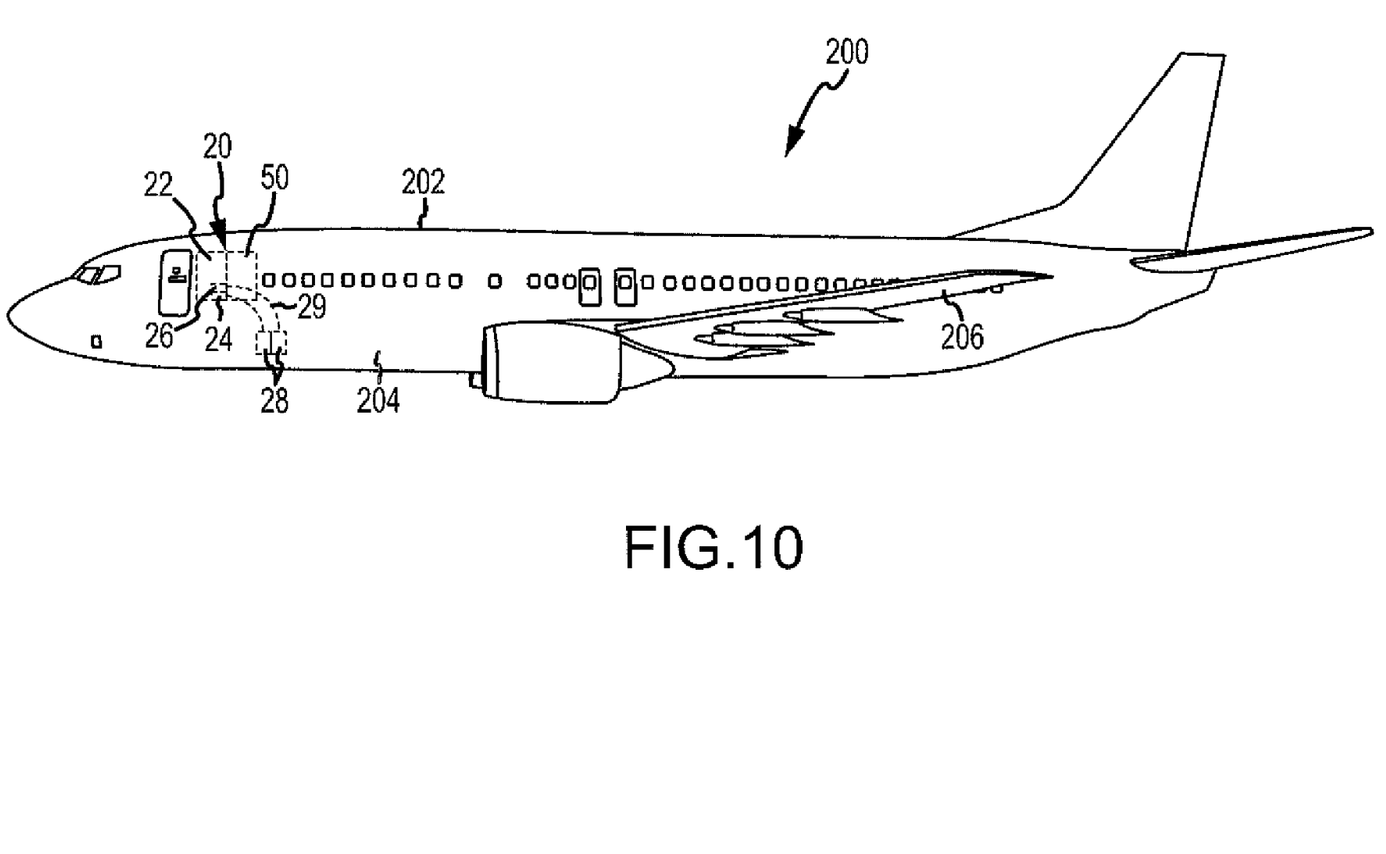

FIG. 10 is a schematic illustration of an aircraft 200 having the localized utility power or energy system 20 of FIG. 2. Alternately, the aircraft 200 may have the localized utility power or energy system 70 of FIG. 3. In this embodiment of the disclosure, there is provided an aircraft 200 comprising an aircraft structure 202 including an elongated body 204 and at least one wing 206 extending laterally from the body, at least one galley 22, and at least one lavatory 50. The localized utility power or energy system for distributing energy to the at least one galley and the at least one lavatory are discussed in detail above in connection with FIGS. 2 and 3. The localized utility energy system is capable of independent operation from a separate aircraft energy generating system, similar to the operation of a utility micro-grid. The localized utility energy system comprises an energy source 23 providing electrical energy, heat energy, and at least one by-product. The energy source 23 comprises a fuel cell 24, a fuel module 26, and optionally at least one supplemental fuel source 28. The by-product may comprise water, waste heat, waste electricity, or another suitable by-product. The localized utility energy system further comprises a plurality of galley and lavatory appliances 40, 42, 44, 45, 58 for receiving the electrical energy, the heat energy, and the at least one by-product. The localized utility energy system further comprises a plurality of connectors 34, 38, 46, 54 for connecting the electrical energy, the heat energy, and the at least one by-product to the galley and lavatory appliances. In one embodiment such as shown in FIG. 2, the aircraft 200 may have the fuel cell and fuel module located within the physical boundaries of the galley or the lavatory, and the at least one supplemental fuel source located in a remote area of the aircraft separate from the galley and the lavatory, wherein the remote area may comprise the cargo bay 32, wing fairings and areas in the extremities of the cargo bay or aft of the pressure bulkhead in the tail (not shown), unused areas forward of the electronic equipment bay or in the upper portion of the cabin (not shown) or another suitable remote location. In another embodiment such as shown in FIG. 3, the aircraft 200 may have the at least one supplemental fuel source located within the physical boundaries of the galley or the lavatory, and the fuel cell and fuel module located in a remote area of the aircraft separate from the galley and the lavatory, wherein the remote area may comprise the cargo bay 32, wing fairings and areas in the extremities of the cargo bay or aft of the pressure bulkhead in the tail (not shown), unused areas forward of the electronic equipment bay or in the upper portion of the cabin (not shown) or another suitable remote location.

Figure 4:
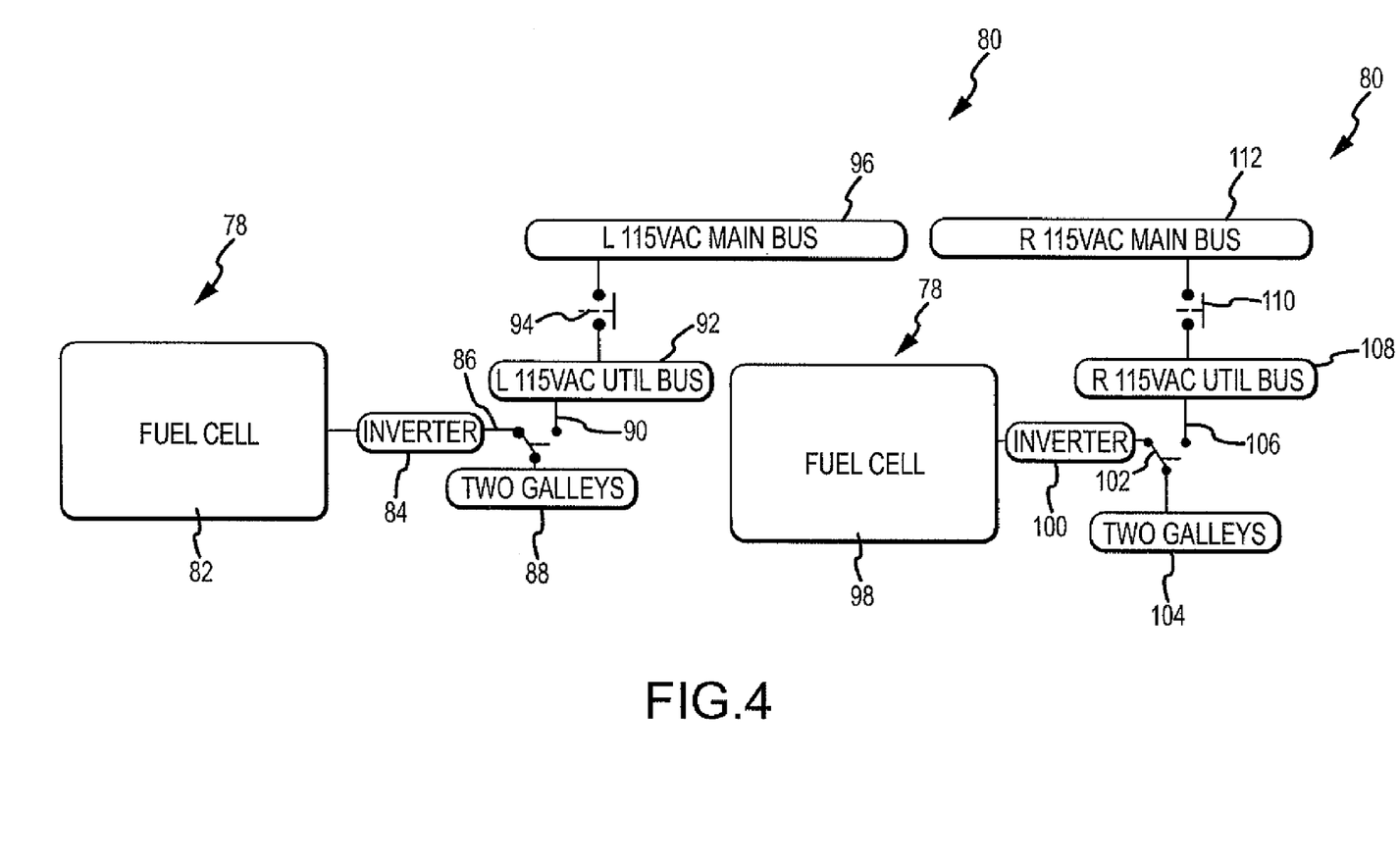
FIG. 4 is a block diagram of an embodiment of a fuel cell system connected to a conventional aircraft electrical system.

FIG. 4 is a block diagram of an embodiment of fuel cell systems 78 connected to conventional aircraft electrical systems 80. The fuel cell systems 78 may be connected to the conventional aircraft electrical systems 80 but the fuel cell systems 78 have the ability to be isolated from the main grid and only provide power to the galley loads. Such architecture is an enabler for an additional emergency power source. FIG. 4 shows a first fuel cell 82 connected to a first inverter 84. The first inverter 84 connects via a first switch portion 86 to galleys 88. The galleys 88 connect via a second switch portion 90 to left 115 VAC (Volts of Alternating Current) utility bus 92. The left 115 VAC utility bus 92 connects via a left utility breaker 94 to left 115 VAC main bus 96. FIG. 4 further shows a second fuel cell 98 connected to a second inverter 100. The second inverter 100 connects via a third switch portion 102 to galleys 104. The galleys 104 connect via a fourth switch portion 106 to right 115 VAC utility bus 108. The right 115 VAC utility bus 108 connects via a right utility breaker 110 to right 115 VAC main bus 112. The fuel cell system shown in FIG. 4 may be one type of fuel cell system used in the systems shown in FIGS. 2 and 3. FIG. 4 is an example showing the capability of the galley to be powered alternatively by the main electrical power system and the fuel cell. This system may provide the capability for load management.

Figure 5:
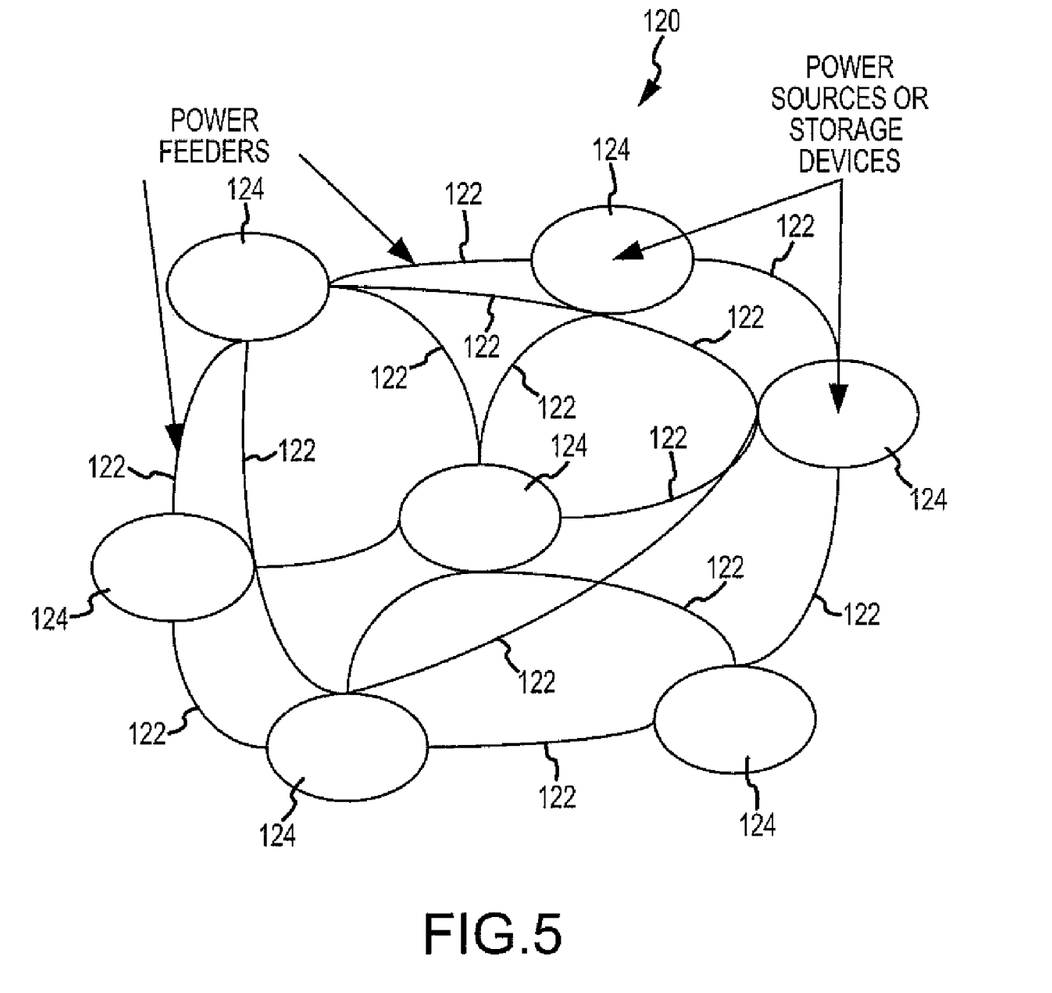
FIG. 5 is a schematic illustration of a network of power sources.
Figure 6:
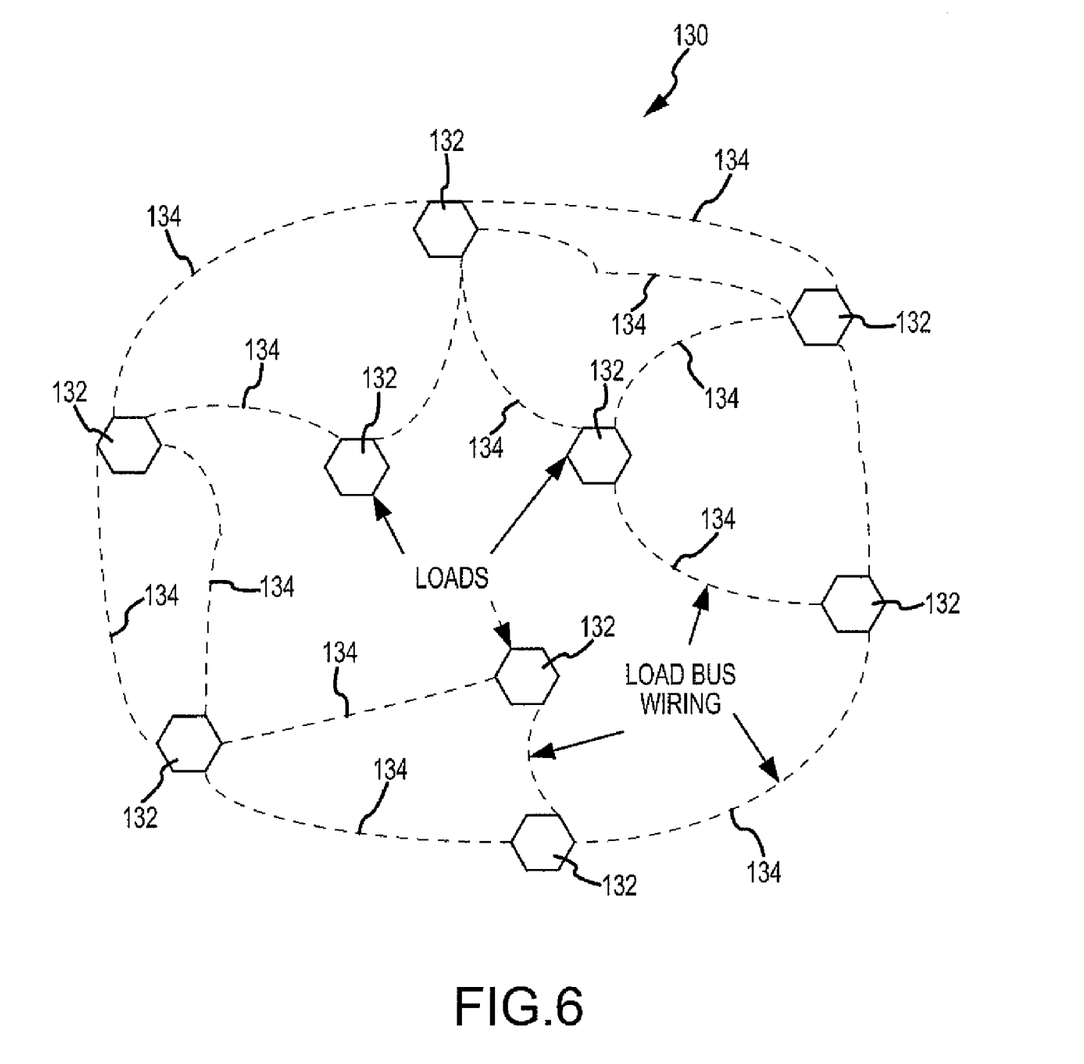
FIG. 6 is a schematic illustration of a network of electrical loads.
Figure 7:
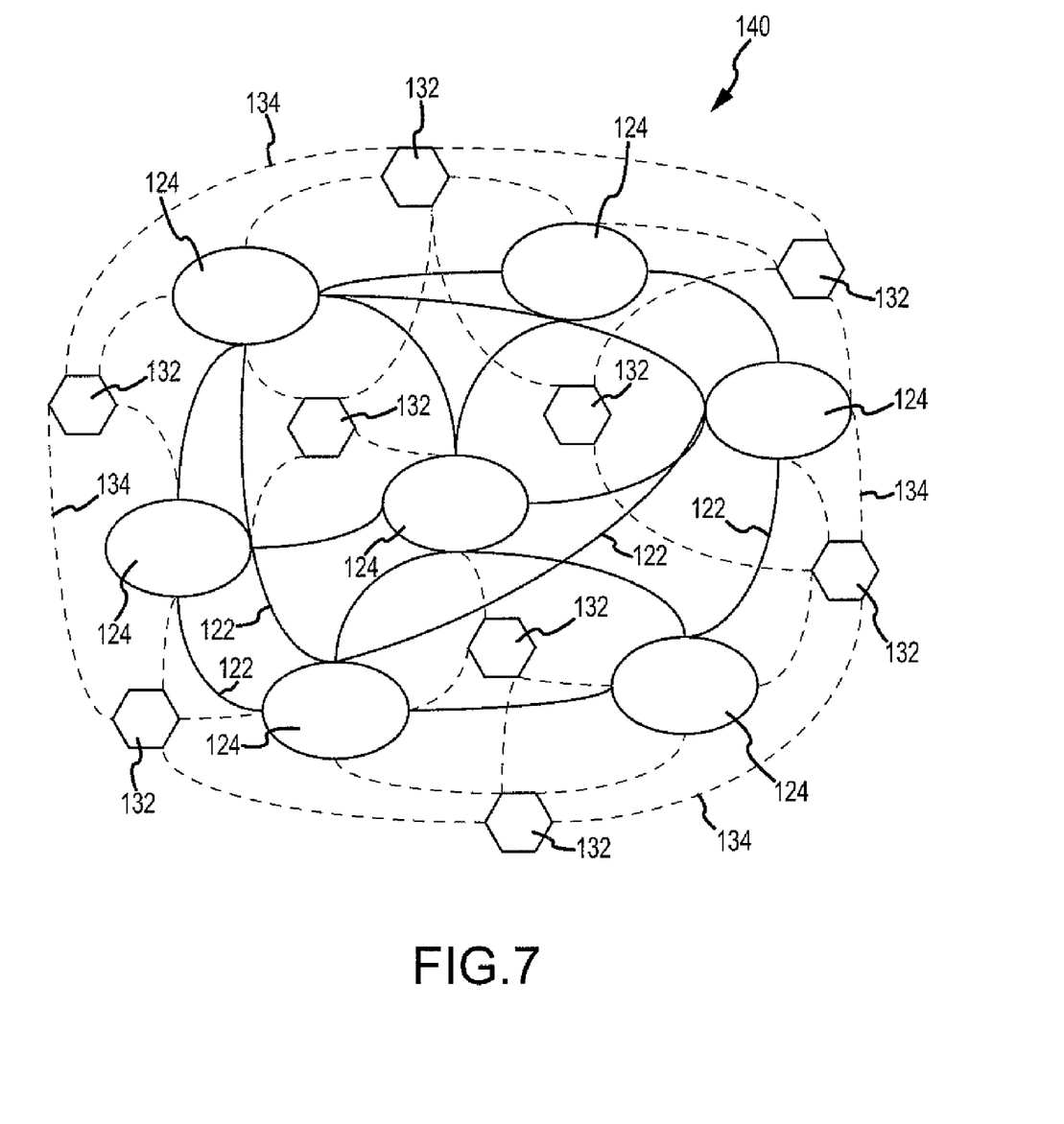
FIG. 7 is a schematic illustration of an electrical grid system incorporating the network of power sources of FIG. 5 overlaid on the network of electrical loads of FIG. 6.
Figure 8:
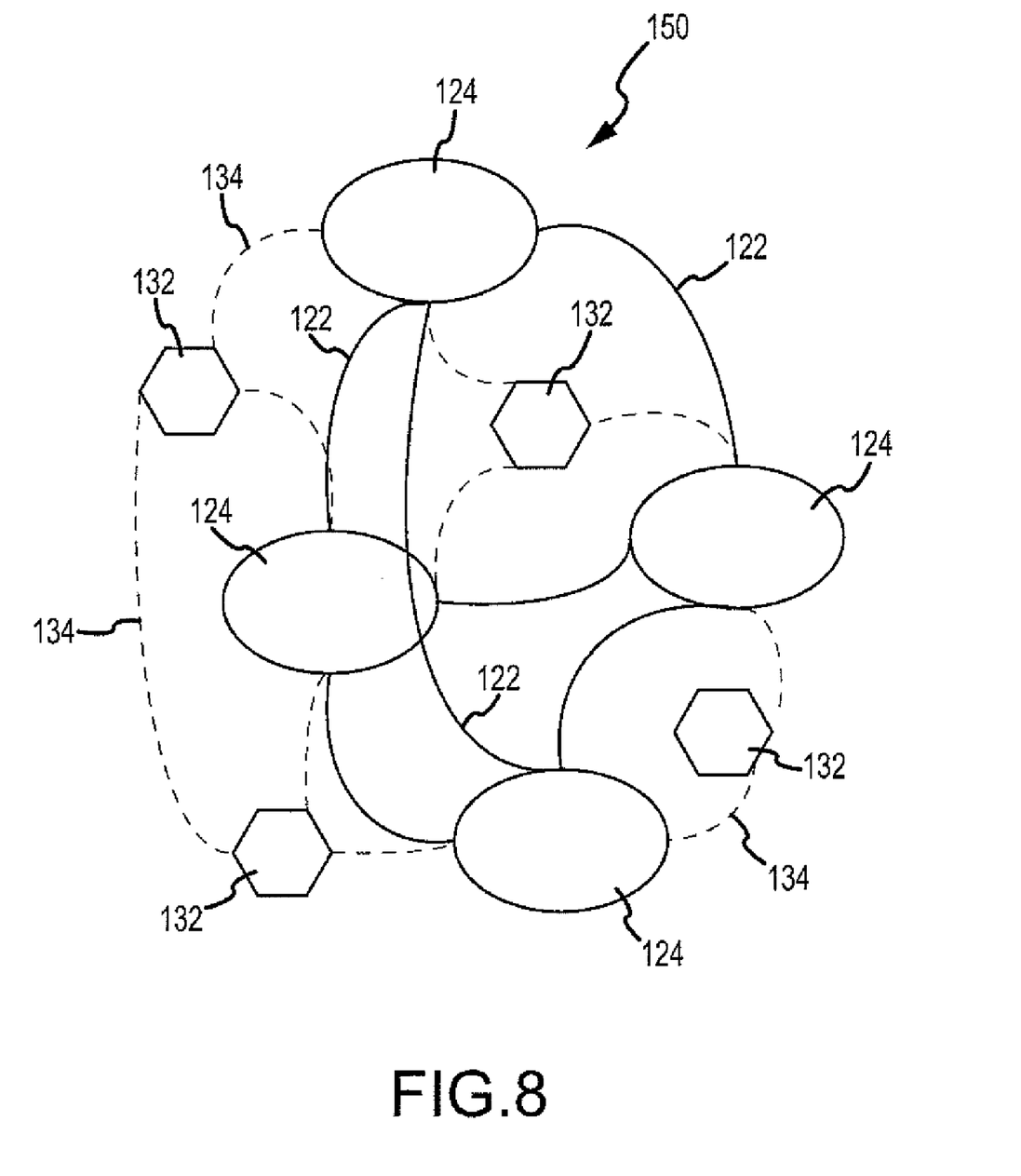
FIG. 8 is a schematic illustration of a micro-grid.
Figure 9:
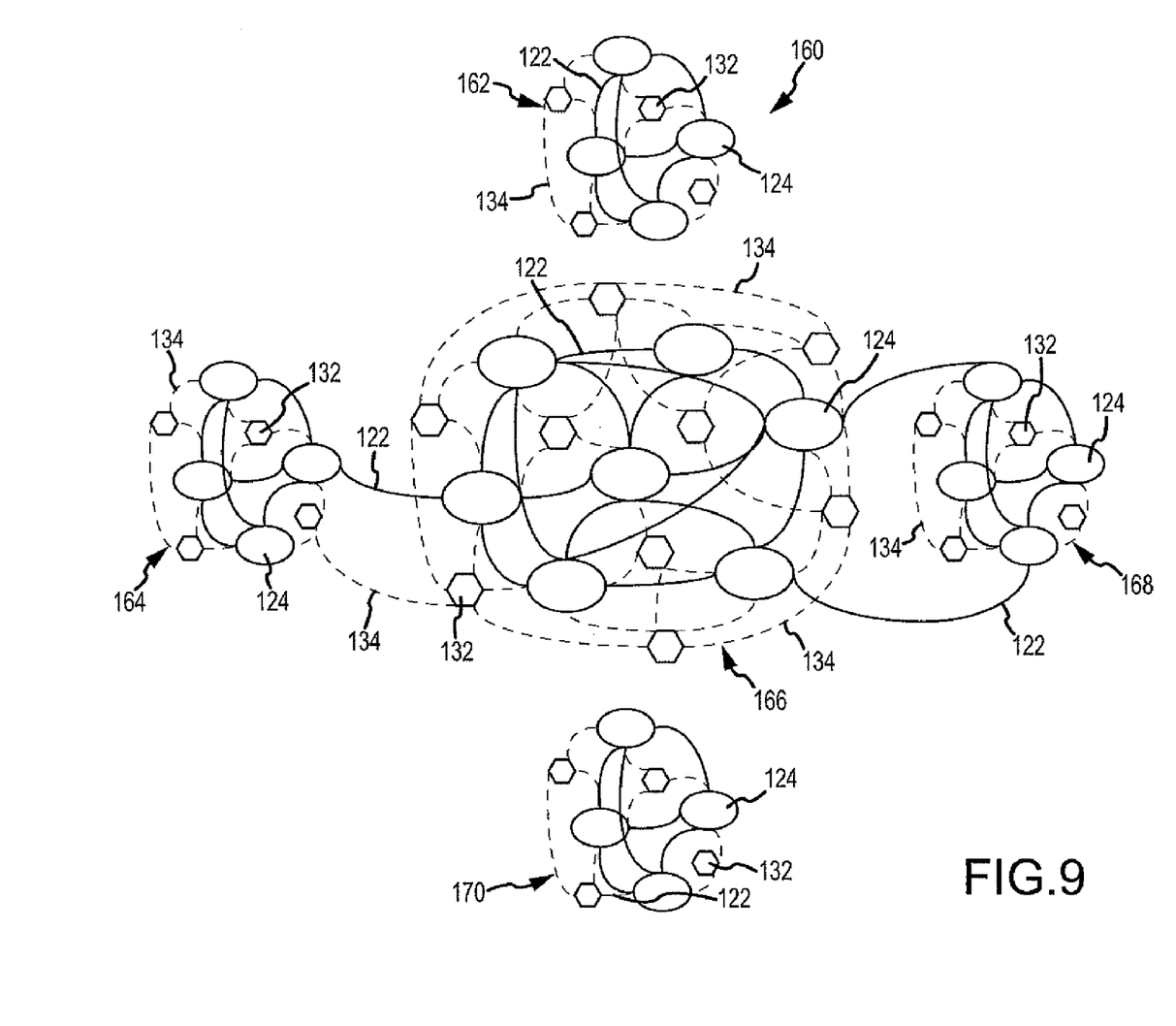
FIG. 9 is a schematic illustration of the electrical grid system of FIG. 7 and multiple micro-grids of FIG. 8, some of which are loosely connected to the electrical grid system; and, FIG. 10 is a schematic illustration of an aircraft having an embodiment of the localized utility power or energy system of the disclosure.

Referring to FIGS. 5-9, electrical grid systems and micro-grid systems that may be used with the localized utility power or energy system of the disclosure are shown. The power or energy system of the disclosure is similar to a utility micro-grid. A micro-grid concept uses other sources of electrical power other than the main grid sources and there is a loose coupling or no coupling with the rest of the grid. The localized utility power or energy system of the disclosure disengages the need for providing power to some of the loads from the electrical power distribution. The localized utility power or energy system of the disclosure may be used with micro-grids which can be operated autonomously from the rest of the main power grid. This provides benefits to the overall grid by providing less dependency on centralized sources of power and also provides improved flexibility in the operation of the grid. A vehicular power distribution system and distributed grid concept is disclosed in U.S. Published Application Number US 2008/0150356 A1, filed Dec. 20, 2006, the entire disclosure of which is incorporated herein by reference. The localized utility power or energy system of the disclosure includes the advantages of the distributed grid concept disclosed in U.S. Published Application Number US 2008/0150356 A1, and further provides for a micro-grid concept that can be applied to an aircraft power system architecture. FIG. 5 is a schematic illustration of a network 120 of power sources 124 interconnected by power feeders 122. FIG. 6 is a schematic illustration of a network 130 of electrical loads 132 interconnected by load bus wiring 134. FIG. 7 is a schematic illustration of an electrical grid system 140 incorporating the network 120 of power sources 124 interconnected by power feeders 122 of FIG. 5 overlaid on the network 130 of electrical loads 132 interconnected by load bus wiring 134 of FIG. 6 with electrical connections between the two networks 120, 130 at various points. As such, in some embodiments, power sources 124 may be located proximally to electrical loads 132. Further, in some embodiments, multiple power sources 124 provide power to each electrical load 132, possibly via any of several available electrical paths, such that failure of one power source may be compensated by other power sources. In another embodiment in which at least one power source is a storage device, the storage device may store energy during normal operation of the power system and provide power sporadically to the system in response to a failure of another power source of the system. It is noted that while the network 120 of power sources 124 may be overlaid on electrical loads 132, the two networks 120, 130 may be interleaved in any way desired. FIG. 8 is a schematic illustration of a micro-grid 150 having power sources 124 interconnected by power feeders 122 and electrical loads 132 interconnected by load bus wiring 134. FIG. 9 is a schematic illustration of a power system 160 having a main power grid 166 such as the electrical grid system of FIG. 7 and multiple micro-grids 162, 164, 168, and 170 such as the micro-grid of FIG. 8. Micro-grids 164 and 168 are loosely connected to the main power grid 166, and micro-grids 162 and 170 are not connected to the main power grid 166.

The main advantage of the localized airplane utility power system is that it does not need to be connected to the overall airplane power system. This offers flexibility in installation and does not add to the complexity or the weight of the overall power system. The localized utility power system may also provide heat energy in addition to electrical power or energy because of its proximity to the loads that require that heat, such as galleys, lavatories, and similar utility loads. With localized power sources which are more efficient than the electrical power from conventional engine generators, the efficiency of the power system of the disclosure is improved by making use of the heat that such localized power sources generate. The water that they generate may also be used thus reducing the weight of greywater carried. The power system of the disclosure also increases the number of power sources on an airplane that can be used for emergency power. This can potentially decrease the need for RATs and overall airplane fuel burn. The power or energy system of the disclosure provides improved efficiency, reduced airplane wiring, reduced weight and reduced complexity.

The power system may be fueled either integrally or remotely and may generate aircraft on-board water for various applications. Fuel cells may generate water as a by-product that can be used for additional greywater or other on-board aircraft applications. The power system may also be incorporated into the aircraft electrical system and provide emergency power to replace or minimize the use of RATs (ram air turbines) and thus decrease the overall weight of the aircraft. The power or energy system may thus have its own fuel source, which allows it to be an additional emergency power source. The power or energy system of the disclosure provides localized electrical power or energy and heat energy for powering electrical loads and heating food or water. When used as a localized utility power supply, the heat as well as the electricity, may be used to heat food, provide hot water in lavatories, and provide heat for other loads that need heat. Use of the heat adds to the efficiency of the fuel cell power source and reduces the need for inefficient aircraft electrical power. The power is preferably provided locally, such as in the galley, lavatory, or similar utility load, thus eliminating or minimizing the need for wiring and wiring connections and complex control and protection. The localized installation reduces manufacturing costs because the galley does not have to be powered from the electrical generating system. The power or energy system is more efficient improving the operating efficiency of the airplane and reducing operating costs. Waste heat is also used rather than being dumped into the cabin where it would add to the operating cost of the airplane since the additional heat would require additional environment control system cooling.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An aircraft galley and lavatory energy system capable of independent operation from a separate aircraft energy generating system, the galley and lavatory energy system consisting of:
    an energy source providing electrical energy, heat energy, and at least one by-product, wherein the energy source consists of a fuel cell and a fuel module both located within physical boundaries of a galley and a lavatory of an aircraft;
    a plurality of galley and lavatory devices receiving the electrical energy, the heat energy, and the at least one by-product; and,
    a plurality of connectors located within the physical boundaries of the galley and the lavatory of the aircraft, the connectors connecting the electrical energy, the heat energy, and the at least one by-product to the galley and lavatory devices,
    wherein the aircraft galley and lavatory energy system is capable of independent operation from a main power grid of the separate aircraft energy generating system.

2. The galley and lavatory energy system of claim 1 wherein the fuel cell is selected from the group consisting of polymer exchange membrane (PEM) fuel cells, alkaline fuel cells, direct methanol fuel cells, enzyme based fuel cells, regenerative fuel cells, phosphoric acid fuel cells, solid oxide fuel cells, and high temperature PEM fuel cells.

3. The galley and lavatory energy system of claim 1 wherein the fuel module supplies fuel to the fuel cell, and the fuel is selected from the group consisting of hydrogen, sodium borohydride, hydrocarbons, methanol, biodiesel, synthetic fuel, kerosene, ethanol, and methane.

4. The galley and lavatory energy system of claim 1 wherein the at least one by-product is selected from the group consisting of water, waste heat, and electricity.

5. The galley and lavatory energy system of claim 1 wherein the galley and lavatory devices are selected from the group consisting of a galley oven, a galley coffee maker, a galley faucet, compartments in food and beverage carts, a lavatory faucet, and a refrigerator.

6. The galley and lavatory energy system of claim 1 wherein the plurality of connectors is selected from the group consisting of electrical power wiring, water heater lines, fuel cell lines, drain lines, communications and control wiring, and protection wiring.

7. The galley and lavatory energy system of claim 1 wherein the galley and lavatory energy system acts as a micro-grid capable of independent operation from the main power grid of the separate aircraft energy generating system.

8. The galley and lavatory energy system of claim 1 wherein the separate energy generating system is selected from the group comprising engine-driven generators, auxiliary power units, ram air turbines (RATs), and electrical distribution systems.

9. A localized utility energy system for distributing energy to an aircraft galley and an aircraft lavatory and capable of independent operation from a separate aircraft energy generating system, the localized utility energy system consisting of:
    an energy source providing electrical energy, heat energy, and at least one by-product, the energy source consisting of a fuel cell and a fuel module both located within physical boundaries of an aircraft galley and an aircraft lavatory and at least one supplemental fuel source, and the at least one by-product consisting of water, waste heat, or electricity;
    a plurality of galley and lavatory appliances receiving the electrical energy, the heat energy, and the at least one by-product; and,
    a plurality of connectors located within the physical boundaries of the aircraft galley and the aircraft lavatory, the connectors connecting the electrical energy, the heat energy, and the at least one by-product to the galley and lavatory appliances,
    wherein the localized utility energy system is capable of independent operation from a main power grid of the separate aircraft energy generating system.

10. The localized utility energy system of claim 9 wherein the fuel cell is selected from the group consisting of polymer exchange membrane (PEM) fuel cells, alkaline fuel cells, direct methanol fuel cells, enzyme based fuel cells, regenerative fuel cells, phosphoric acid fuel cells, solid oxide fuel cells, and high temperature PEM fuel cells.

11. The localized utility energy system of claim 9 wherein the fuel module supplies fuel to the fuel cell, and the fuel is selected from the group consisting of hydrogen, sodium borohydride, hydrocarbons, methanol, biodiesel, synthetic fuel, kerosene, ethanol, and methane.

12. The localized utility energy system of claim 9 wherein the localized utility energy system acts as a micro-grid capable of independent operation from the main power grid of the separate aircraft energy generating system.

13. An aircraft comprising:
an aircraft structure including an elongated body and at least one wing extending laterally from the body, at least one galley, and at least one lavatory; and,
a localized utility energy system for distributing energy to the at least one galley and the at least one lavatory, the localized utility energy system consisting of:
an energy source providing electrical energy, heat energy, and at least one by-product, the energy source consisting of a fuel cell and a fuel module both located within physical boundaries of the galley and the lavatory of the aircraft structure, and the at least one by-product consisting of water, waste heat, or electricity;
a plurality of galley and lavatory appliances receiving the electrical energy, the heat energy, and the at least one by-product; and,
a plurality of connectors located within the physical boundaries of the galley and the lavatory of the aircraft, the connectors connecting the electrical energy, the heat energy, and the at least one by-product to the galley and lavatory appliances,
wherein the localized utility energy system is capable of independent operation from a main power grid of a separate aircraft energy generating system.

14. The aircraft of claim 13 wherein the fuel cell is selected from the group consisting of polymer exchange membrane (PEM) fuel cells, alkaline fuel cells, direct methanol fuel cells, enzyme based fuel cells, regenerative fuel cells, phosphoric acid fuel cells, solid oxide fuel cells, and high temperature PEM fuel cells.

15. The aircraft of claim 13 wherein the fuel module supplies fuel to the fuel cell, and the fuel is selected from the group consisting of hydrogen, sodium borohydride, hydrocarbons, methanol, biodiesel, synthetic fuel, kerosene, ethanol, and methane.

16. The galley and lavatory energy system of claim 13 wherein the galley and lavatory devices are selected from the group consisting of a galley oven, a galley coffee maker, a galley faucet, compartments in food and beverage carts, a lavatory faucet, and a refrigerator.

17. The galley and lavatory energy system of claim 13 wherein the plurality of connectors is selected from the group consisting of electrical power wiring, water heater lines, fuel cell lines, drain lines, communications and control wiring, and protection wiring.

18. The aircraft of claim 13 wherein the localized utility energy system acts as a micro-grid capable of independent operation from the main power grid of the separate aircraft energy generating system.

* * * * *